US012525211B2

(12) United States Patent
Wintersteen

(10) Patent No.: US 12,525,211 B2
(45) Date of Patent: Jan. 13, 2026

(54) STRINGED INSTRUMENT, SYSTEM, AND METHODS OF MAKING AND USING SAME

(71) Applicant: Kielty Wintersteen, Manchester, CT (US)

(72) Inventor: Kielty Wintersteen, Manchester, CT (US)

( * ) Notice: Subject to any disclaimer, the term of this patent is extended or adjusted under 35 U.S.C. 154(b) by 635 days.

(21) Appl. No.: 17/894,826

(22) Filed: Aug. 24, 2022

(65) Prior Publication Data

US 2024/0071339 A1 Feb. 29, 2024

(51) Int. Cl.
*G10D 1/04* (2020.01)
*G10D 3/04* (2020.01)

(52) U.S. Cl.
CPC ................. *G10D 1/04* (2013.01); *G10D 3/04* (2013.01)

(58) Field of Classification Search
CPC .. G10D 1/04; G10D 3/04; G10D 1/02; G10D 3/14
See application file for complete search history.

(56) References Cited

U.S. PATENT DOCUMENTS 2,310,199 A * 2/1943 Beauchamp ............. G10H 3/18
84/723

OTHER PUBLICATIONS https://www.bing.com/videos/riverview/relatedvideo?q=How+To+Make+A+PVC+Violin+Part+1%2c+2%2c+3+(youtube.com)&mid=57158BE4288E1FCF7A0857158BE4288E1FCF7A08&FORM=VIRE Parts 1-3 (Year: 2014).*

* cited by examiner

*Primary Examiner* — Kimberly R Lockett
(74) *Attorney, Agent, or Firm* — UConn IP Law Clinic; Jacob Gardner; Charles Gaglione

(57) ABSTRACT

A stringed musical instrument is disclosed comprising a first tube including a body portion having a bottom end and a top end, and a neck portion with a first end extending longitudinally from the bottom end of the body portion, and a second end. A first string support is connected to the second end of the neck portion, and includes a peg box supporting a plurality of tuning pins. A plurality of musical instrument strings extend from the body portion to the tuning pins. The instrument also includes a bridge with a body-contacting portion configured to engage with the body portion, and a string-contacting portion configured to engage with the plurality of strings, and a second tube extending outwardly from the top end of the body portion, forming a chin rest. Corresponding systems and methods also are disclosed.

20 Claims, 13 Drawing Sheets

STRINGED INSTRUMENT, SYSTEM, AND METHODS OF MAKING AND USING SAME

BACKGROUND

This disclosure relates generally to plastic alternatives to traditional wooden stringed instruments, particularly to plastic violins.

A few plastic stringed instruments are generally known, but most replicate the form and shape of a traditional violin. These instruments do not mitigate the fragility or expense of wooden instruments.

It would be useful to develop/improve the affordability and availability of alternative stringed instruments, allowing for greater access to the musical arts, particularly in schools with budgetary constraints.

SUMMARY

One embodiment described herein is a stringed musical instrument comprising a first tube including a body portion having a bottom end and a top end, and a neck portion with a first end extending longitudinally from the bottom end of the body portion, and a second end. A first string support is connected to the second end of the neck portion, the first string support including a peg box supporting a plurality of tuning pins. A plurality of musical instrument strings extend from the body portion to the tuning pins. The instrument also includes a bridge with a body-contacting portion configured to engage with the body portion and a string-contacting portion configured to engage with the plurality of strings, and a second tube extending outwardly from the top end of the body portion, forming a chin rest.

Another embodiment described herein is the above stringed musical instrument, further comprising a sound hole formed on the body portion between the bridge and the first string support.

Yet another embodiment is the above stringed musical instrument, further comprising fine tuning pegs connected to the front side of the body portion.

A further embodiment is a method of manufacturing a stringed musical instrument comprising the steps of: obtaining a first tube comprising a body portion and neck portion, a second tube configured to function as a chin rest, and a plurality of musical strings, and forming a first string support adjacent to an outer end of the neck portion, the first string support comprising openings configured to receive a plurality of tuning pins. A second string support is formed on the body portion by forming holes in the body portion configured to receive and retain the plurality of musical strings. The method also includes forming a bridge comprising a body-contacting portion configured to slidably engage with the body portion and a string-contacting portion configured to support the plurality of musical strings when tensioned. The method further comprises assembling the instrument by sliding the bridge on the first tube, attaching the second tube to the terminal end of the body portion at an angle, mounting a plurality of tuning pins to the first string support, and attaching the plurality of strings to the first string support and the second string support such that they extend along the string-contacting portion of the bridge.

Another embodiment is the above method, wherein at least the first tube is hollow, and the first string support is formed by removing a partial longitudinal section of tube material from one end of the first hollow tube, and bending the remaining longitudinal section of the first hollow tube into a configuration suitable to receive a plurality of tuning pegs.

Yet another embodiment is the above method, further comprising softening the remaining longitudinal section of the first hollow tube before bending.

BRIEF DESCRIPTION OF THE DRAWINGS

The invention may take form in various components and arrangements of components, and in various steps and arrangements of steps. The drawings, wherein like reference numerals are used for like components throughout the several views, are only for purposes of illustrating preferred embodiments and are not to be construed as limiting the invention.

DETAILED DESCRIPTION

Figure 1:
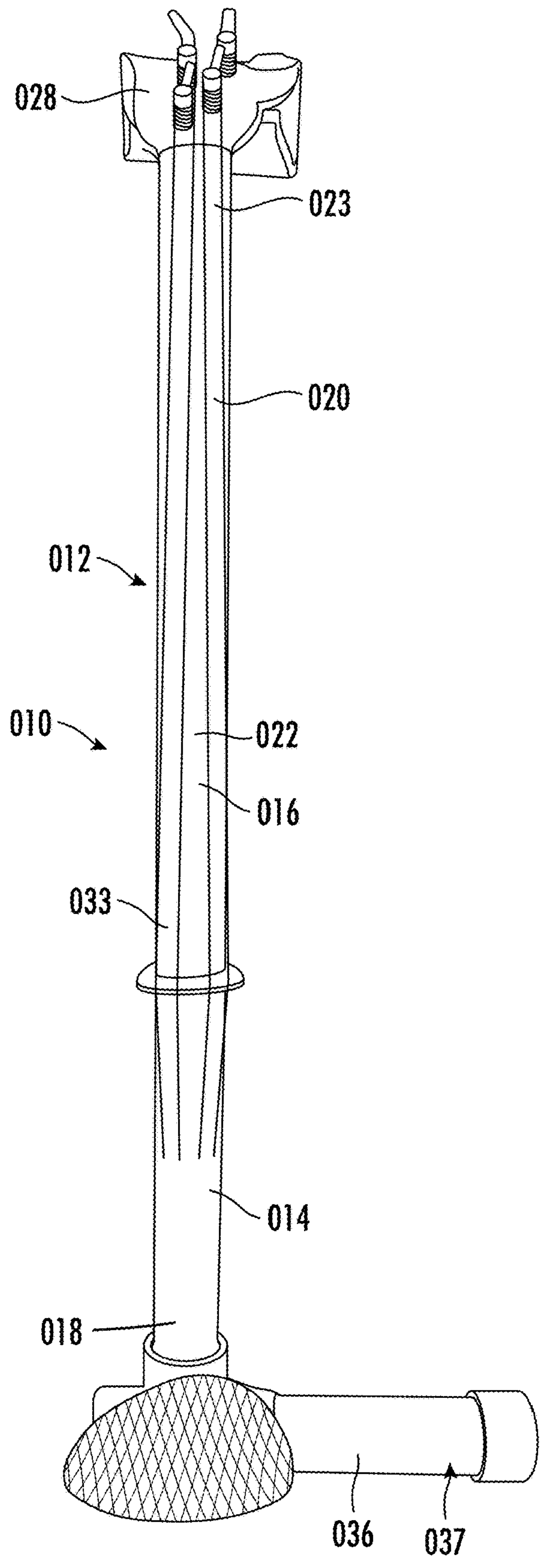
FIG. 1 is a front-perspective view of a first embodiment of a stringed musical instrument in the form of a violin showing the body portion, neck portion, and curved fixture of the stringed musical instrument.
Figure 2:
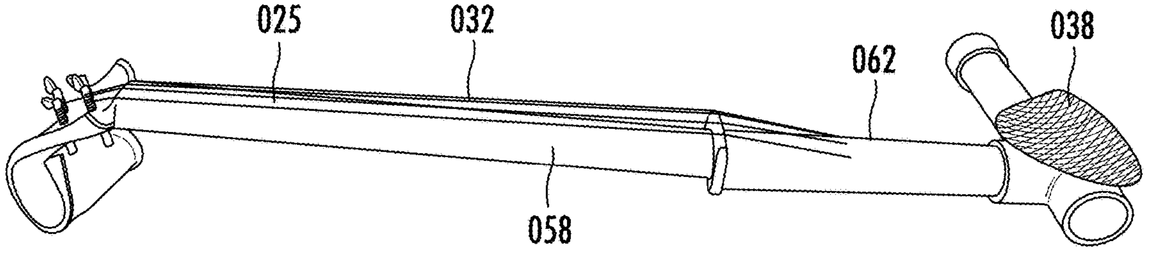
FIG. 2 is a left-side view of the stringed musical instrument of FIG. 1.
Figure 3:
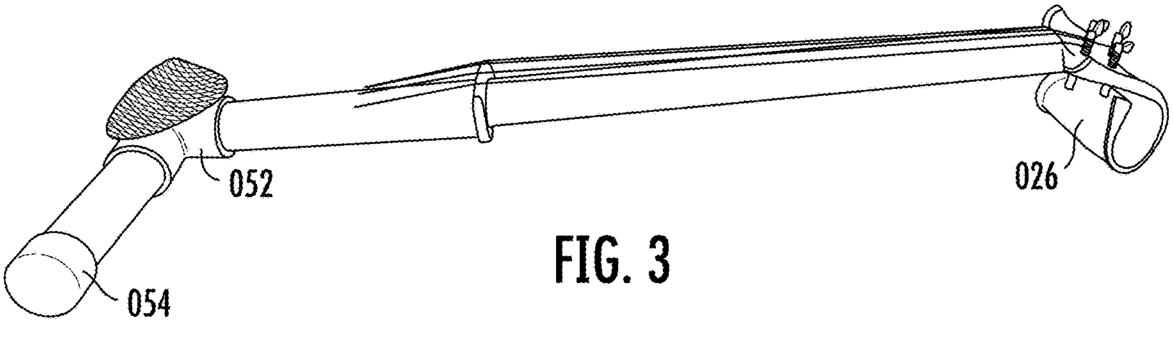
FIG. 3 is a right-side view of the stringed musical instrument of FIG. 1.
Figure 4:
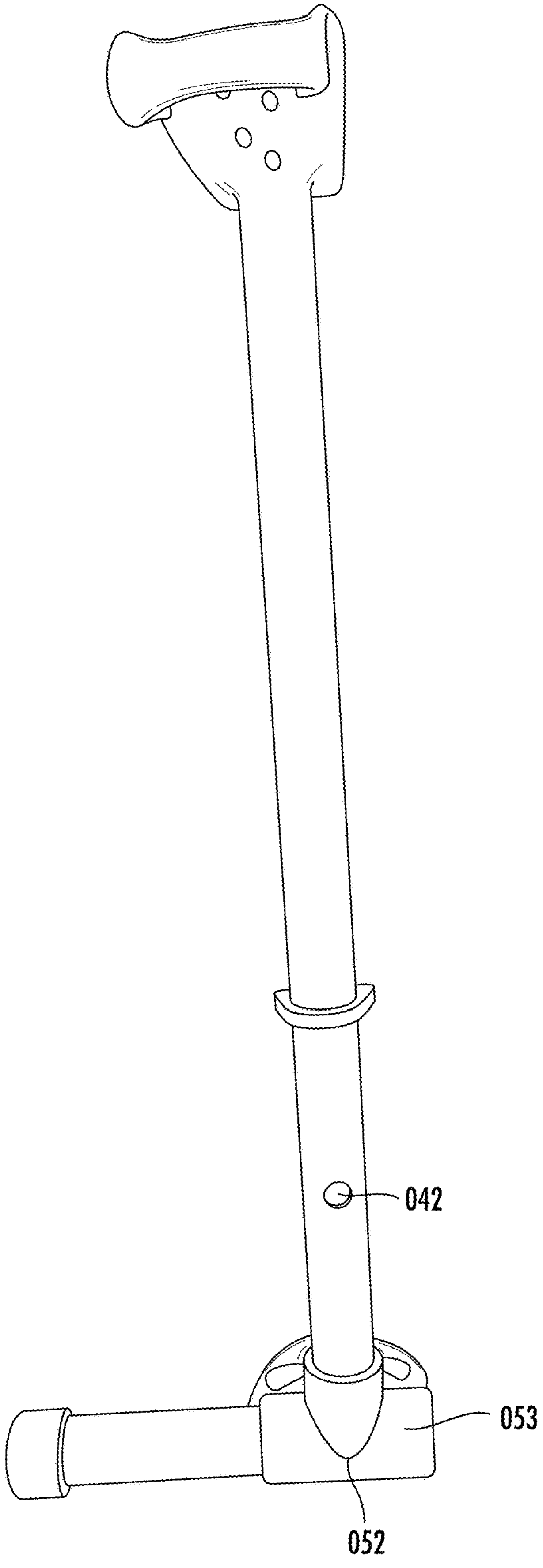
FIG. 4 is a rear-perspective view of the stringed musical instrument of FIG. 1.
Figure 5A:
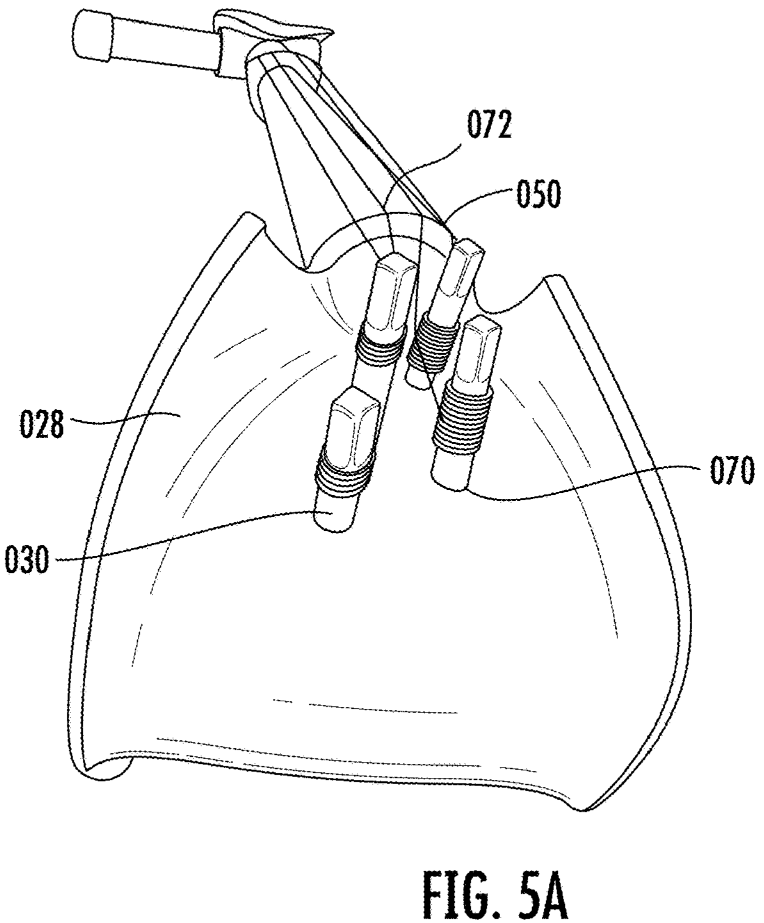
FIG. 5A is a bottom end view with of the stringed musical instrument of FIG. 1.
Figure 5B:
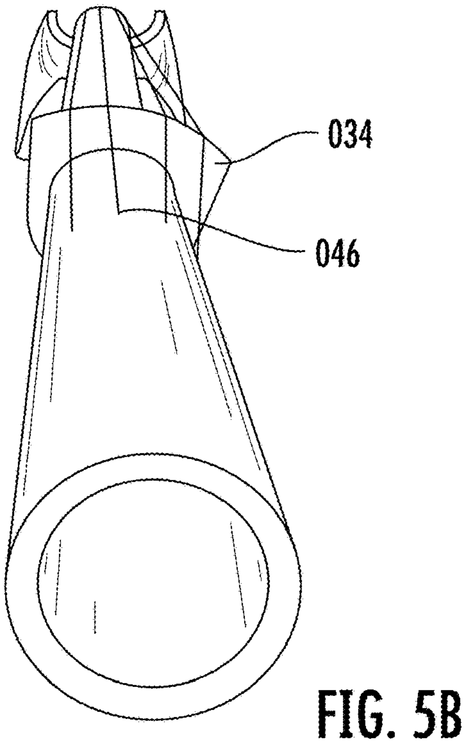
FIG. 5B is a top end view of the instrument in FIG. 1 with the chin rest removed.
Figure 6:
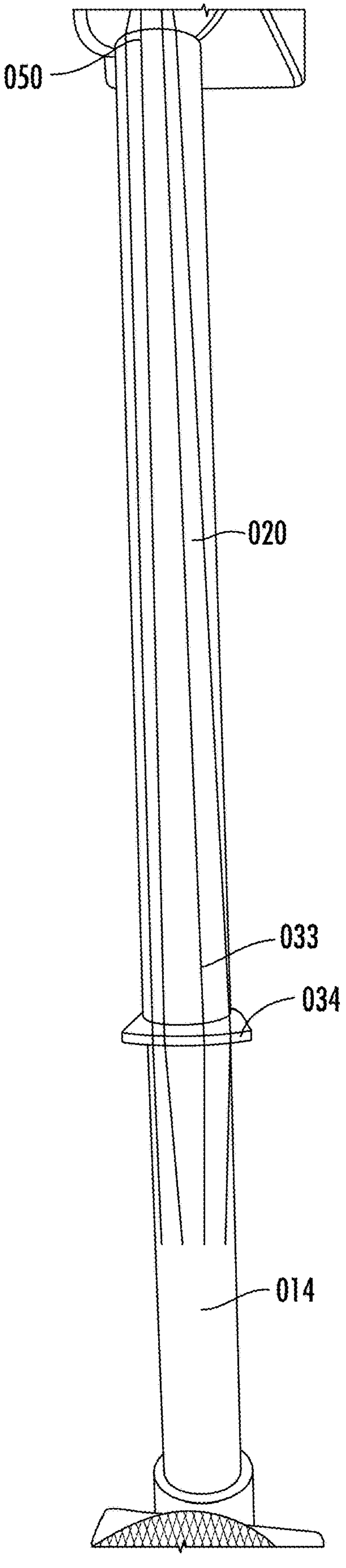
FIG. 6 is a close-up view of the body portion and neck portion of the stringed musical instrument of FIG. 1.
Figure 7A:
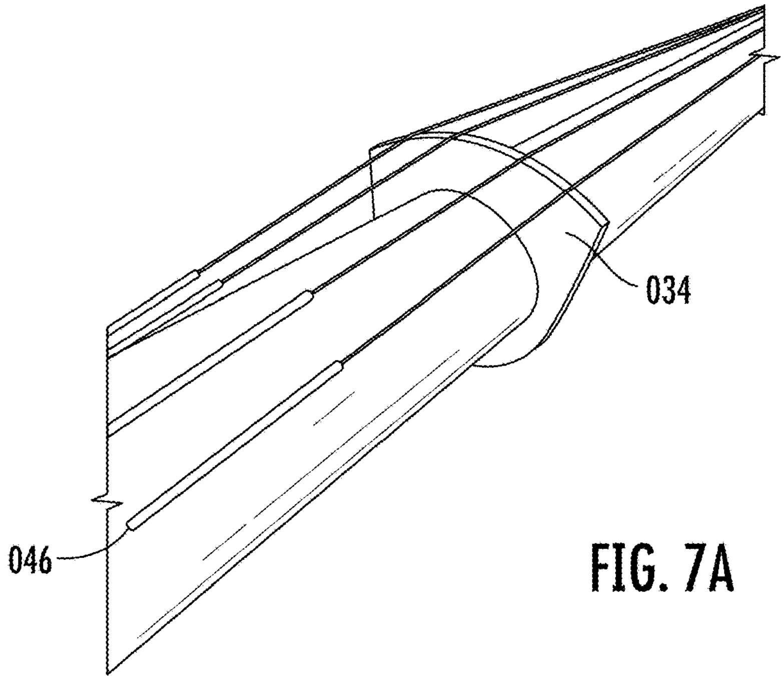
FIG. 7A is detail view a ring-shaped bridge.
Figure 7B:
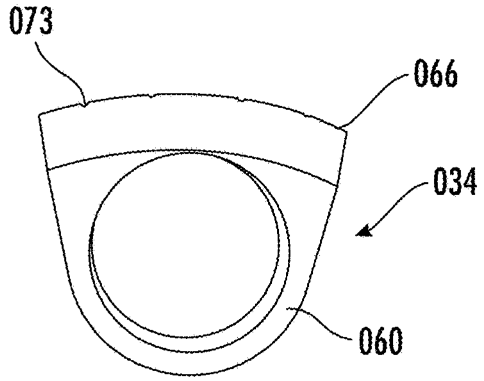
FIG. 7B is a close-up front facing view of the bridge in FIG. 7A.
Figure 7C:
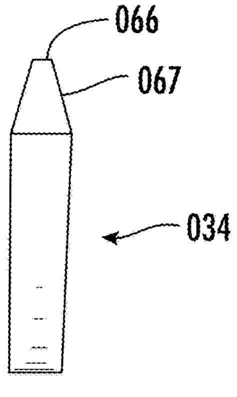
FIG. 7C is a close-up left-side view of the bridge in FIG. 7A.
Figure 8A:
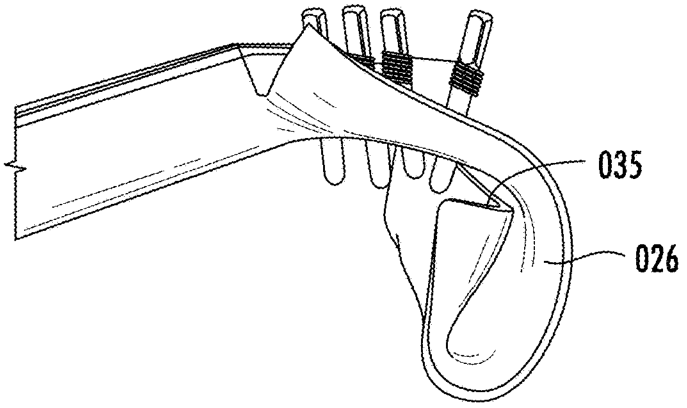
FIG. 8A is a close-up side right perspective view of the string support of the stringed musical instrument of FIG. 1 illustrating a peg box comprising a plurality of tuning pegs and a scroll.
Figure 8B:
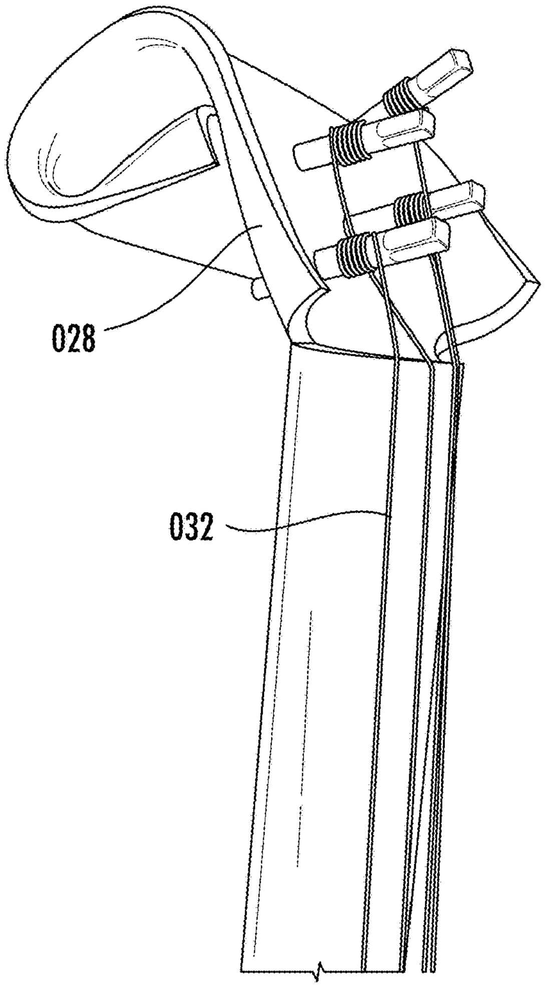
FIG. 8B is a close-up left-side view of the string support shown in FIG. 8A.
Figure 9A:
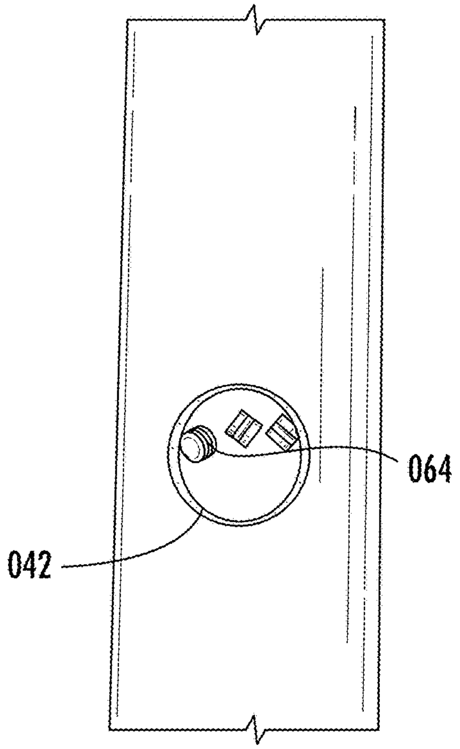
FIG. 9A is a detail view of a hole and ball-end violin string attachment mechanism inside the stringed musical instrument of FIG. 1.
Figure 9B:
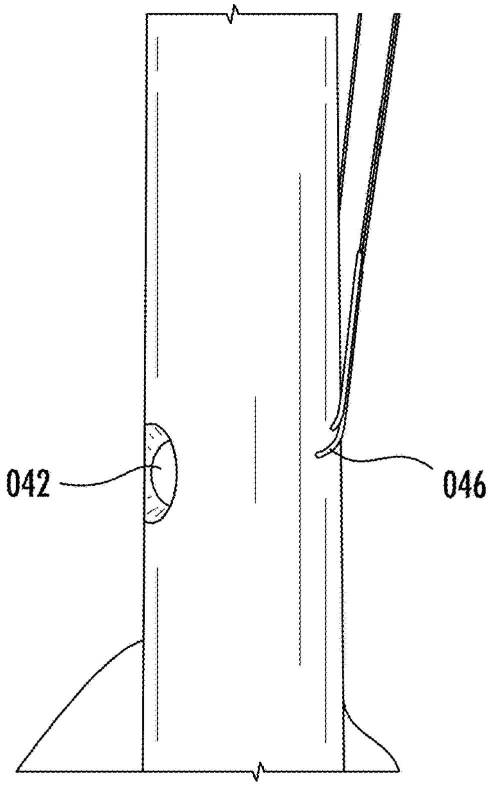
FIG. 9B is a close-up side-view of the hole in FIG. 9A.
Figure 10:
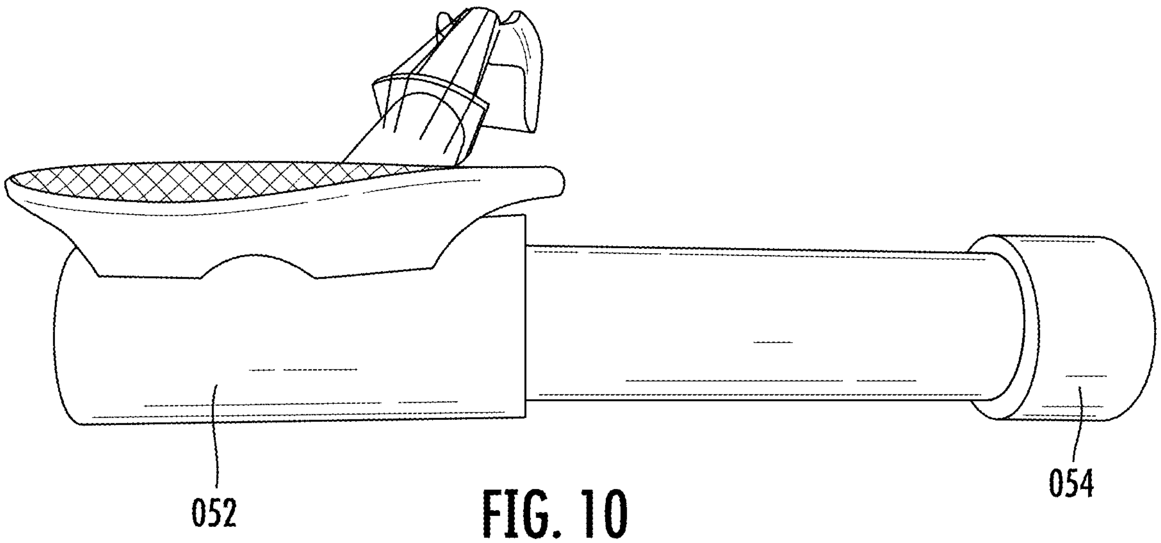
FIG. 10 is a bottom-end view of the stringed musical instrument in FIG. 1 illustrating a chin rest.
Figure 11:
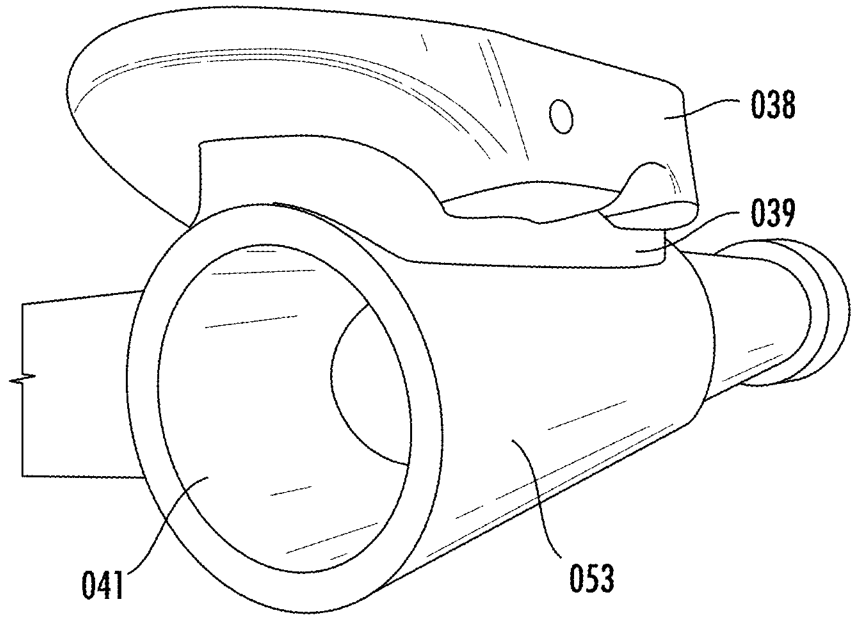
FIG. 11 is a left-side view of the chin rest in FIG. 10.

The embodiments disclosed herein are tube-shaped musical instruments made from thermoplastic or thermoset material. The musical instruments are configured to replicate the function and sound of a traditional wooden violin. The use of this less expensive type of material and the simple shape allow for low manufacturing costs, increase access to those interested in learning how to play stringed instruments and further make the instrument itself more durable for transportation.

As used herein, the term “nut” is used in the traditional musical sense as the grooved section at the head of a violin on which strings rest. The term “bridge” means the musical device on which musical strings rest on the main body of the instrument.

Referring to FIGS. 1-11, a first embodiment of a stringed musical instrument is designated as [010]. The instrument [010] is made from a thermoplastic or thermoset polymer material that includes a main tube [012] having a body portion [014] with a bottom end [016] and a top end [018], and a neck portion [020] with a first end [022] connected to the bottom end [016] of the body portion [014], and an opposite second end [023]. A fingerboard [025] is disposed in the central part of the next portion toward the second end [023]. The second end [023] of the neck portion [020] is connected to a string support, which is usually a peg box [028] in which a plurality of musical strings [032] are attached. In the embodiment shown in the Figures, the peg box [028] and a decorative scroll [026] are formed from a portion of the main tube [012], as described in detail below. A smaller secondary tube [036] made from a thermoplastic or thermoset polymer material is connected to the top end [018] of the main tube [012] at an angle. In the embodiment shown in the figures, the secondary tube [036] is connected to the main tube [012] at an angle of about 90 degrees, however, the angle between the axis of the main tube [012] and the secondary tube can be somewhat greater or less than 90 degrees, and typically is in the range of about 80 degrees to about 100 degrees. The top end [018] of the body portion [014] has an open end to which the smaller secondary tube [036] is attached to form a chin rest [037]. A cushioning member [038] is attached to the chin rest [037] using an adhesive [039] or another suitable connecting device. Usually, the main tube [012] and the secondary tube [036] are hollow tubes. A cap [054] is disposed on the right terminal end of the secondary tube [036] to promote favorable sound quality for the stringed instrument [010]. The left terminal end of the secondary tube [036] has an opening which is not capped and is disposed inside a T-shaped coupling [052] which is used to connect the body portion [014] to the secondary tube [036]. The third arm [053] of the T-shaped coupling is uncapped, forming an opening [041] into which sound can travel from the body portion [014].

In some cases, the peg box [028] and scroll [026] are made by cutting part way through the main tube [012] on the front side of the neck portion [020] in a direction perpendicular to the length of the main tube [012] (in some cases approximately six inches from the bottom end [016]), and cutting longitudinally along the left and right sides from the terminal end [035] of the tube [012] to the perpendicular cut. A semicircular segment of the neck portion [020], having a length of about six inches in some instances, is removed after cutting. The remaining half of the tube near the bottom end [016] of the neck portion [020] is heated until the tube material is malleable, and this portion of the neck [020] is then bent backwards towards the rear side [058] of the tube, with the terminal end portion of the bottom end [016] being formed into a scroll [026] that is generally similar to the scroll on a wood violin. It is noted that the scroll [026] itself is decorative rather than functional, and therefore can be eliminated in certain embodiments. Once cooled, a plurality of tuning pins, such as zither pins [030] are inserted into the peg box [028], which is positioned on the cut portion of the neck [020] adjacent the non-cut portion at the second end [023] of the neck portion [020]. A plurality of bores [070] are formed in the peg box [028] that are configured to receive the zither pins [030]. In the embodiment shown in FIGS. 1-11, four zither pins [030] are disposed in four bores [070]. One string [032] is fastened to and wrapped around each zither pin [030]. Where the tube was cut perpendicularly, a plurality of notches [072] dimensioned to receive strings are sliced in a direction parallel to the length of the main tube [012] on the front side [062] of the main tube [012], usually at equal distance apart, to create the nut [050]. In the embodiment shown in FIGS. 1-11, four notches [072] are used, one for each of the four musical strings [032].

In embodiments, a plurality of string holes [046] are cut into the front side [062] of the body portion [014]. In some cases the string holes [046] are disposed about 3½ inches to about 4 inches from the top end [018] of the body portion [014], or about 3¾ inches to about 3% inches from the top end [018], and a larger access hole [042] cut into the rear side [058] of the instrument at the same distance to provide access for attaching strings [032]. The musical strings [032] as illustrated in the Figures are ball-end violin strings. The strings [032] are attached on the inside of the tube [012] and each string [032] is threaded through the string hole [046] to the front side [062] of the tube [012] on the body portion [014]. In this first embodiment [010], an access hole [042] is formed on the back side of the tube [012] to thread the strings through the string holes [046] and to later access the ball-end [064] of the strings [032]. The access hole [042] can be rectangular, circular, oblong, oval, or of another suitable shape.

The strings [032] are connected from these string holes [046] to the zither pins [030] on the peg box [028] at the bottom end [016] of the neck portion [020], each resting on a groove [080] in a ring-shaped bridge [034]. The bridge [034] is positioned near the string holes [046]. In some cases, the neck portion [020] has a length 12¾ inches (this will depend on the overall length of the main tube [012]) from the top end [018] and the nut [050]. The strings [032] include a bow-contacting section [033] adjacent to the bridge on the side of the body portion that is connected to the neck portion. The length of the bow-contacting section [033] typically is similar to the length of a bow-contacting section on a wood violin.

The bridge [034] may be formed from a synthetic material, such as a polymer. The bridge [034] may be formed from a single piece of thermoplastic material, such as nylon, and includes a string-contacting portion [066] and a tube-contacting portion [060]. In some cases, the bridge is formed by additive manufacturing, such as by 3D printing. In the embodiment shown in the figures, the body-contacting portion [060] is in the shape of a ring that fits around the body portion [014] of the tube [012]. The string-contacting portion [066] extends from the top of the ring and is in the curved design of a classical string instrument bridge when viewed from the end of the instrument, with a plurality of notches [073] cut into the bridge [034] for the musical strings [032] to rest on. When the bridge is viewed from the side of the instrument [010], the string-contacting portion [066] appears generally flat, with straight, outwardly tapering sides [067] extending downwardly therefrom. The bridge [034] slides onto the tube [012] from the top end [018] and, in some cases, sits about 12½ inches to about 13 inches, or about 12¾ inches, from the nut [050] (depending on the overall length of the main tube [012]). The bridge

[034] is held in place by the pressure of the musical strings [032]. In some cases, the bridge is adhered to the body portion [014]. In some cases, such as when the main tube [012] has an inner diameter of ¾ inches, the bridge [034] can be 1⅞ inches tall and ¼ inches wide, with a thickness of about ¼ inches at the tube-contacting portion [060] and about 1/16 inches at the string-contacting portion [066].

The bridge [034] is designed to fit onto the tube [012] by sliding it onto the top end [018] of the body portion [014] before the secondary tube [036] is attached to the body portion [014]. The use of a thermoplastic or thermoset polymer bridge [034] instead of a classical bridge made of thin wood, makes the bridge [034] more durable and less expensive to replace, making the instrument [010] more affordable. A classical wooden bridge would also not fit onto the tubular shape of the stringed instrument [010].

The musical strings [032] may be standard violin or viola strings. The instrument [010] may be played either by plucking individual strings [032] or using a bow, such as a standard wood-and-horsehair or carbon fiber horsehair violin bow [074]. The type of bow does not impact functionality, although sound quality may be diminished if a lower quality bow is used. Zither pins [030] are useful to support the strings in the peg box [028] for their light weight and ability to support violin-sized strings and maintain tension for good tuning. Other types of supports for holding tunable strings, such as pegs, alternatively can be used provided that the fit between the pegs and the opening in the peg box ensure that the strings hold their tune while maintaining an ability to be turned.

Figure 12:
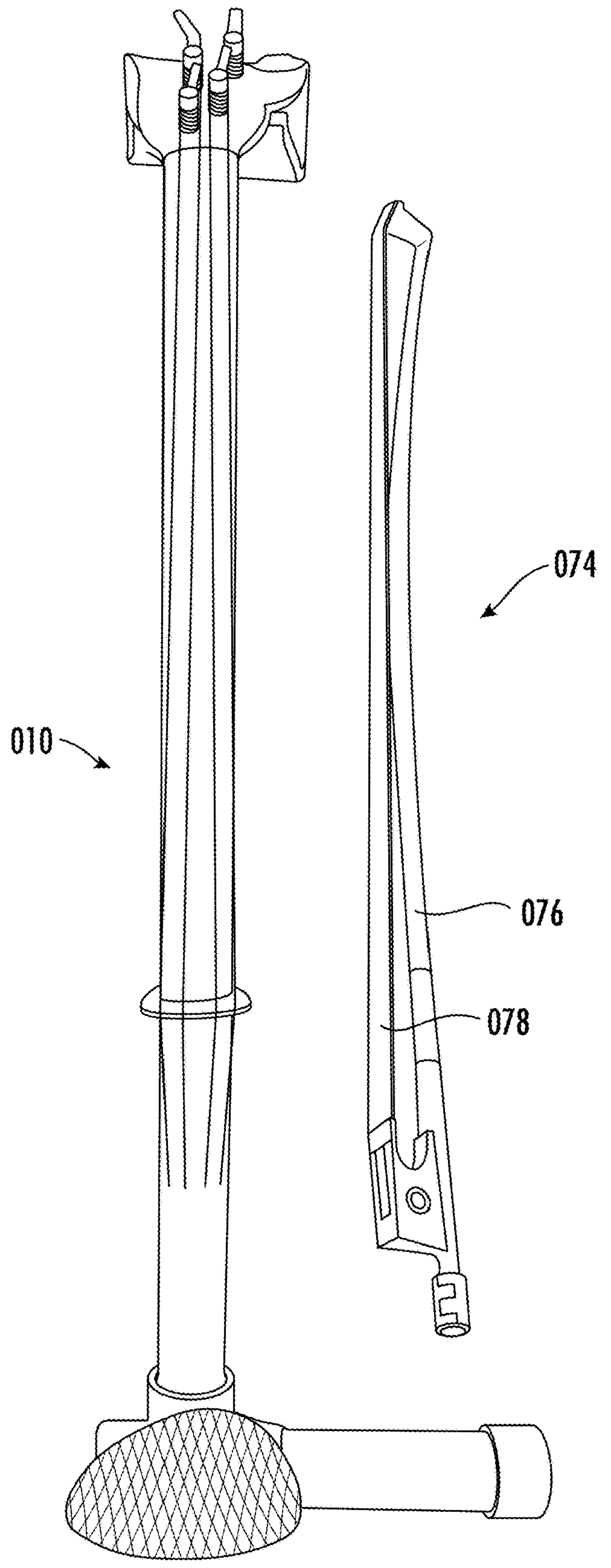
FIG. 12 is a system including the stringed musical instrument of the first embodiment and a bow.

FIG. 12 shows a system that includes the stringed instrument [010] of FIGS. 1-11 and a bow [074]. In embodiments, the bow [074] is a conventional bow. Bows typically include a tensioned stick [076] made of wood, carbon fiber, a thermoplastic material, or a thermoset material, and hair [078], such as horsehair. The hair [078] usually is covered with rosin. Due to the dimensions of the body portion [014], neck portion [020] and secondary tube [036], and the configuration of openings in the tube, and the ease in positioning the bridge, the stringed instrument can achieve a sound similar to that of a traditional violin at a fraction of the cost, thereby enabling a broader audience of musicians to own and use the instrument as compared to traditional stringed instruments.

One method of manufacturing the stringed musical instrument [010] from a thermoplastic polymeric material comprises the following steps. A hollow thermoplastic tube [012] of about 24 inches in length and about ½ inches to about 1 inches, or about ¾ inches in inner diameter, is laterally cut about halfway through the tube about 19½ inches from the top end [018]. The remaining half of the cut tube is placed into boiling water until the thermoplastic material is malleable. Once malleable, the material is folded at, e.g., a forty-five degree angle to form a scroll and cooled to form a peg box [028]. Once cooled, a plurality of bores [070] are formed to receive zither pins [030] and a plurality of zither pins [030] are inserted into the peg box [028]. A nut [050] is formed at the neck portion [020] by cutting a plurality of notches into the thermoplastic material. A ring-shaped bridge [034] is mounted to the main tube body [012] by sliding it along the tube [012] from the top end [018] to, in some cases, about 12¾ inches from the nut [050]. A plurality of string holes [046] are drilled, in some cases about 3% inches from the top end [018] of the body portion [014]. On the rear side [058] of the tube [012], a ½ inch access hole [042] is drilled to thread the ball-end [064] of the violin strings [032] from the inside of the main body tube [012]. The musical strings [032] are threaded from the ball ends [064] through the string holes [046] and connected to the zither pins [030] on the peg box [028], resting on the notches in the bridge [034] and the nut [050]. A second smaller thermoplastic tube comprising a chin rest [036] is attached with a T-shaped coupling [052] perpendicular to the main tube [012] and fastened with a cushioning member [038].

Figure 13:
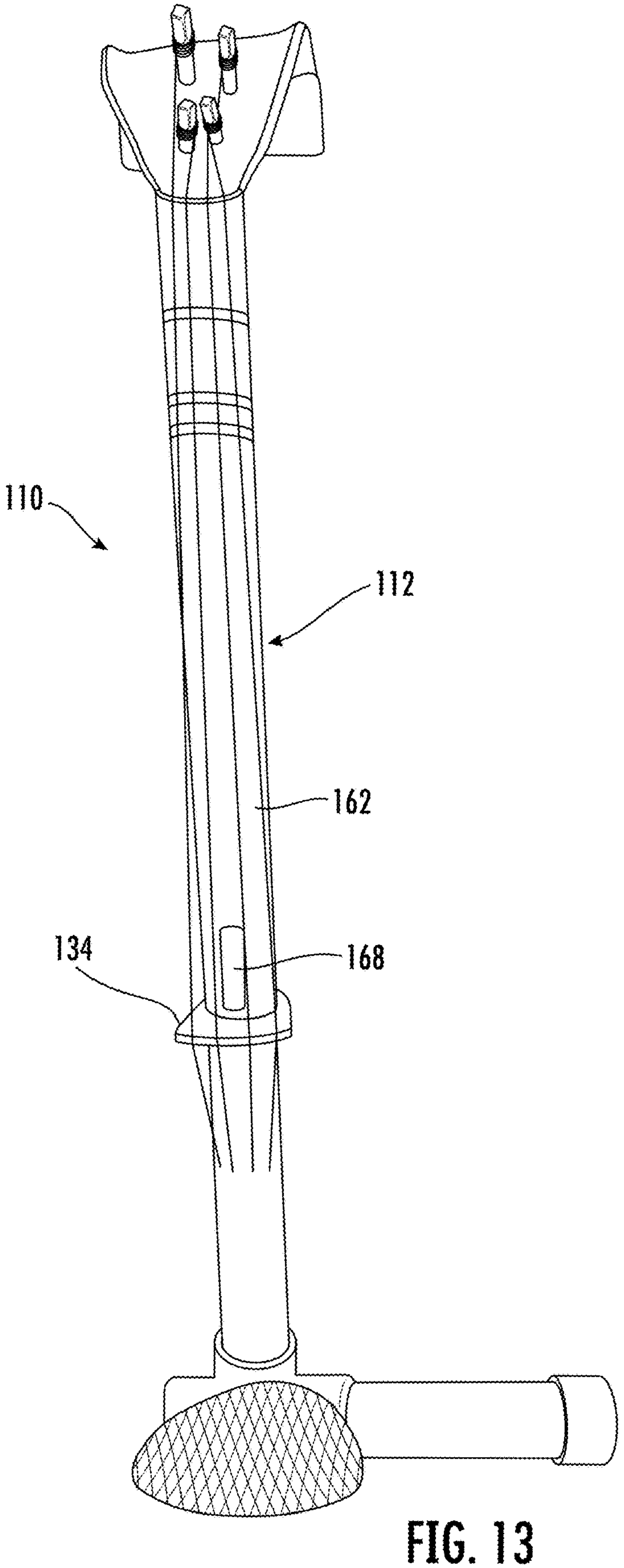
FIG. 13 is a front perspective view of a second embodiment of a stringed musical instrument in the form a violin showing the body portion, neck portion, and curved fixture of the stringed musical instrument.
Figure 14:
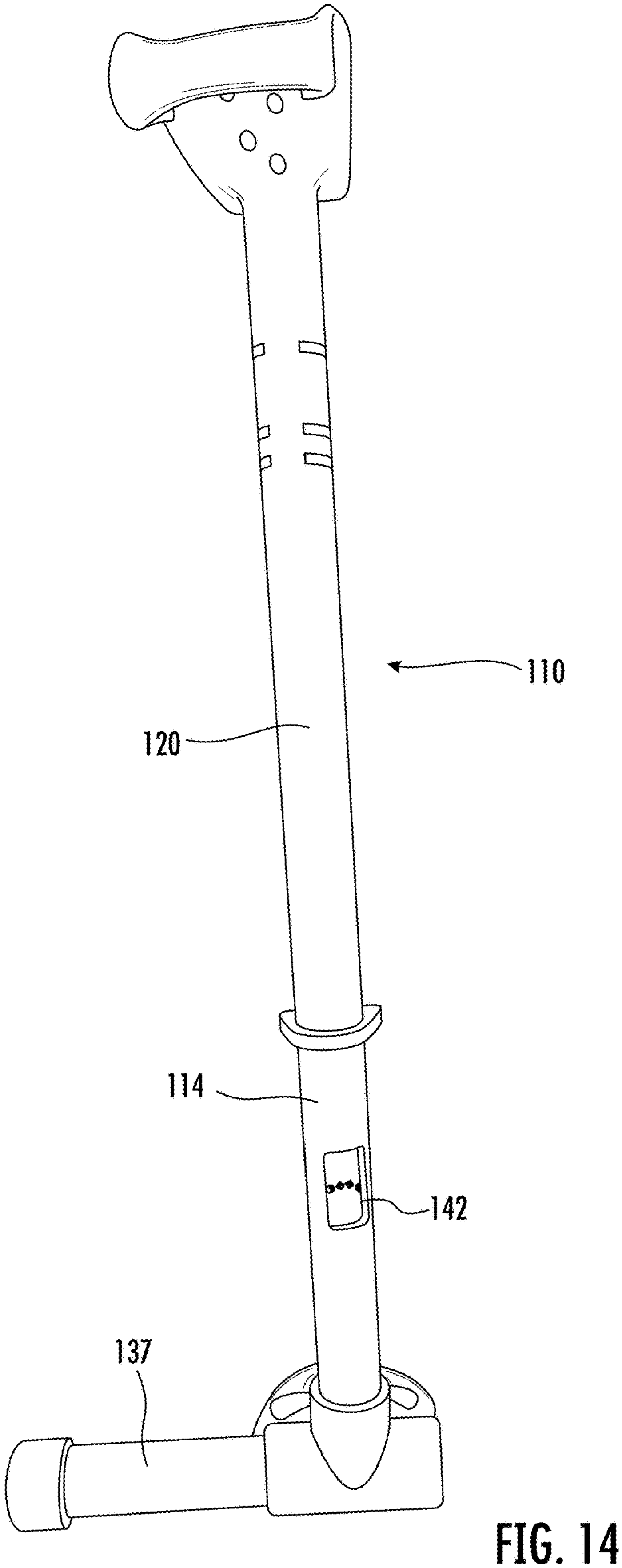
FIG. 14 is a rear-view of the embodiment of FIG. 13.

As is shown in FIGS. 13-14, a second embodiment of the above stringed musical instrument [110] which incorporates the above description, further comprising a sound hole [168] cut on the front side [162] of the main tube [112] adjacent to the bridge [134] on the neck [120] side of the bridge [134]. This hole [168] can be rectangular, circular, oblong, oval, or of another suitable shape, and functions to enhance vibrations and resonance. Similar to the embodiment for FIGS. 1-11, this embodiment includes an access hole [142] on the body portion [114] on the chin rest [137] side of the bridge [134] for attachment of the strings.

Figure 15:
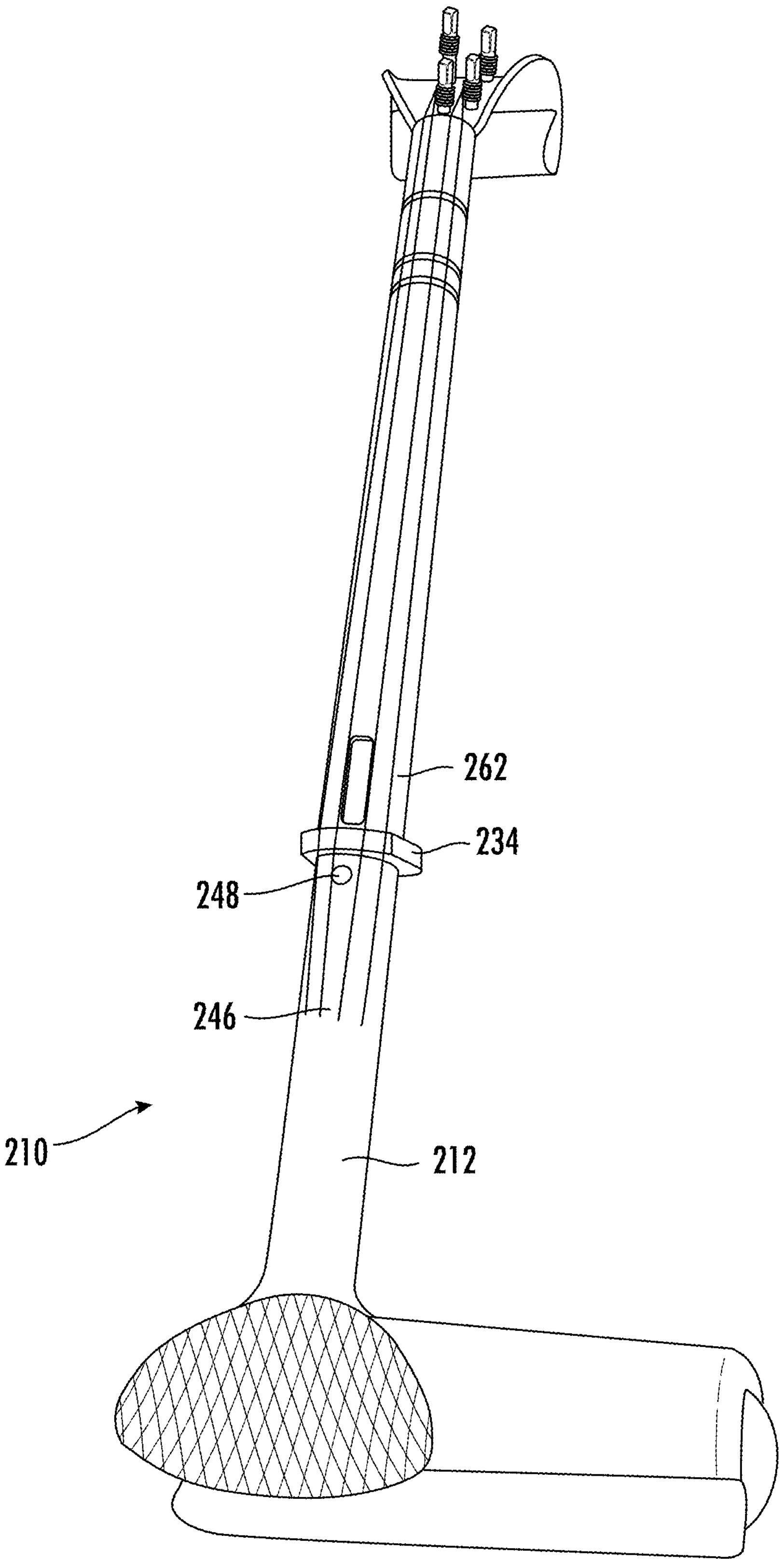
FIG. 15 is a front perspective view of a third embodiment of a stringed musical instrument in the form a violin showing the body portion, neck portion, and string support of the stringed musical instrument.

A third embodiment of the above stringed musical instrument, shown in FIG. 15 and designated at [210], incorporates many of the features of the embodiments of FIGS. 1-14 and also has fine tuner adjusters [248] placed on the front side [262] of the main tube body [212] between the bridge [234] and the string holes [246]. The fine tuners [248] are an optional accessory for the instrument [210] to facilitate precision tuning.

The musical instrument [010] can be made with a variety of materials, including but not limited to polyvinyl chloride (PVC), acrylonitrile butadiene styrene (ABS) and polycarbonate. Different component parts can be made from different materials. Any rigid, durable polymeric material can be used for the body portion and neck portion provided it does not have a negative impact on the functionality, durability and/or quality of the instrument. Thermoplastic polymeric materials are particularly useful in order than the peg box and decorative scroll, if included, can be formed by softening one end of the tube material using heat.

The instrument [010] may also be in different sizes, similar to different sizes available for traditional string instruments. Traditional violin sizes are made dependent on the arm length of the player, most commonly youths: 4/4 size ("full sized"); ¾ size; ½ size; and ¼ size. Different sizes may be used dependent on the age, experience level, or physical size of the person playing the instrument. The illustrated instrument [010] is a full-sized and is 24 inches long before the scroll portion has been cut and bent); a ¾ size instrument is formed from a tube with an original length of 23 inches; a ½ size instrument is formed from a tube that is 22 inches long; and a ¼ size instrument is formed from a tube that is 21 inches long. The instrument can also replicate a viola, cello or bass, using suitable strings and having suitable dimensions.

In embodiments, the thermoplastic tube has an internal diameter of about ½ inches to about 1 inch, or about ¾ inches. The distance from the nut [050] to the bridge [034] is about 10 inches to about 15 inches, or about 12 to about 14 inches, or about 13 inches. The distance from the bridge [034] to the string holes [046] is about 2 inches to about 3 inches, or about 2½ to about 2¾ inches or about 2¾ inches. The distance from the string holes [046] to the top end of the instrument [018] is about 3 inches to about 4½ inches, or about 3½ to about 4 inches, or about 3⅞ inches.

A number of alternatives, modifications, variations, or improvements therein may be subsequently made by those skilled in the art, which are also intended to be encompassed by the following claims.

What is claimed is:

1. A stringed musical instrument comprising:

a first tube including a body portion having a front side and a rear side, a bottom end and a top end, and a neck portion with a first end extending longitudinally from the bottom end of the body portion, and a second end;

an opening formed on the rear side of the body portion;

a first string support connected to the second end of the neck portion, the first string support including a peg box supporting a plurality of tuning pins;

a plurality of musical instrument strings extending from the body portion to the tuning pins;

a bridge with a body-contacting portion configured to engage with the body portion, and a string-contacting portion configured to engage with the plurality of strings; and a second tube extending outwardly from the top end of the body portion, forming a chin rest.

2. The stringed musical instrument of claim 1 wherein the bridge is ring-shaped.

3. The stringed musical instrument of claim 2 wherein the bridge is configured to slidably engage with the body portion.

4. The stringed musical instrument of claim 2 further comprising a cushioning member connected to at least one of the top end of the body portion and the second tube.

5. The stringed musical instrument of claim 1 wherein the neck portion includes a fingerboard.

6. The stringed musical instrument of claim 2, wherein the second tube is connected to the body portion with a T-shaped coupling.

7. The stringed musical instrument of claim 2, wherein the second tube is closed by a cap at an outer end and open at an inner end.

8. The stringed musical instrument of claim 1 wherein the first tube comprises at least one of a thermoplastic material and a thermoset material.

9. The stringed musical instrument of claim 1 wherein the first tube comprises polyvinyl chloride.

10. The stringed musical instrument of claim 1 further comprising a nut formed on the neck portion.

11. The stringed musical instrument of claim 1 wherein a plurality of string holes are formed in the body portion between the bridge and the second tube.

12. The stringed musical instrument of claim 1 wherein the plurality of musical strings are ball-end strings fastened inside the body portion.

13. The string musical instrument of claim 1, wherein the bridge is a one-piece polymeric component formed by additive manufacturing.

14. The stringed musical instrument in claim 1, further comprising a sound hole formed on the body portion between the bridge and the first string support.

15. The stringed musical instrument of claim 1, further comprising fine tuning pegs connected to the front side of the body portion.

16. A stringed musical instrument comprising:

a first tube including a body portion having a bottom end and a top end, and a neck portion with a first end extending longitudinally from the bottom end of the body portion, and a second end;

a first string support connected to the second end of the neck portion, the first string support including a peg box supporting a plurality of tuning pins;

a plurality of musical instrument strings extending from the body portion to the tuning pins;

a one-piece ring-shaped polymeric bridge with a body-contacting portion configured to slidably engage with the body portion, and a string-contacting portion configured to engage with the plurality of strings; and a second tube extending outwardly from the top end of the body portion, forming a chin rest.

17. The stringed musical instrument of claim 16 wherein the neck portion includes a fingerboard.

18. The stringed musical instrument of claim 16 wherein the first tube comprises at least one of a thermoplastic material and a thermoset material.

19. The stringed musical instrument of claim 16 wherein the first tube comprises polyvinyl chloride.

20. A stringed musical instrument comprising:

a first tube including a body portion having a bottom end and a top end, and a neck portion with a first end extending longitudinally from the bottom end of the body portion, and a second end;

a first string support connected to the second end of the neck portion, the first string support including a peg box supporting a plurality of tuning pins;

a plurality of musical instrument strings extending from the body portion to the tuning pins;

a bridge with a body-contacting portion configured to engage with the body portion, and a string-contacting portion configured to engage with the plurality of strings;

a sound hole formed on the body portion between the bridge and the first string support; and a second tube extending outwardly from the top end of the body portion, forming a chin rest.

* * * * *